(12) United States Patent
Barron

(10) Patent No.: US 9,955,306 B1
(45) Date of Patent: Apr. 24, 2018

(54) COMMUNICATION BETWEEN VEHICLES

(71) Applicant: Jack Barron, Southboro, MA (US)

(72) Inventor: Jack Barron, Southboro, MA (US)

( * ) Notice: Subject to any disclaimer, the term of this patent is extended or adjusted under 35 U.S.C. 154(b) by 0 days.

(21) Appl. No.: 15/430,530

(22) Filed: Feb. 12, 2017

Related U.S. Application Data

(63) Continuation-in-part of application No. 14/205,559, filed on Mar. 12, 2014, now abandoned.

(51) Int. Cl.
G06K 9/54 (2006.01)
G06K 9/60 (2006.01)
H04W 4/02 (2018.01)
H04W 8/26 (2009.01)
G06F 17/30 (2006.01)

(52) U.S. Cl.
CPC ........ *H04W 4/023* (2013.01); *G06F 17/3053* (2013.01); *G06F 17/3087* (2013.01); *H04W 8/26* (2013.01)

(58) Field of Classification Search
CPC ............. G06F 17/3053; G06F 17/3087; G06F 17/30247; G06F 17/30725; H04W 4/023; G06Q 10/10; G01C 21/26
See application file for complete search history.

(56) References Cited

U.S. PATENT DOCUMENTS

| 2012/0089675 A1* | 4/2012 | Thrower, III | G06Q 10/10 709/204 |
| 2012/0116661 A1* | 5/2012 | Mizrachi | G06Q 10/10 701/300 |
| 2013/0238441 A1* | 9/2013 | Panelli | B60Q 1/503 705/14.62 |

* cited by examiner

Primary Examiner — Phuoc Tran
(74) Attorney, Agent, or Firm — Patent GC, LLC; Gary S. Engelson

(57) ABSTRACT

According to aspects of embodiments of the invention, a computer-implemented process comprises: operating a server holding a database of visual data identifying a plurality of vehicles and a communication contact identifier associated with each of the plurality of vehicles; and providing to a user a software application constructed and arranged to retrieve a communication contact identifier from the database using visual data provided by the user identifying a vehicle with which communication is desired.

12 Claims, 5 Drawing Sheets

COMMUNICATION BETWEEN VEHICLES

BACKGROUND

The present invention is useful for communicating between vehicles using a variety of communication tools, even when the communication is to be initiated to a vehicle or person unknown except visually to the initiator.

SUMMARY

According to aspects of embodiments of the invention, a computer-implemented process comprises: operating a server holding a database of visual data identifying a plurality of vehicles and a communication contact identifier associated with each of the plurality of vehicles; and providing to a user a software application constructed and arranged to retrieve a communication contact identifier from the database using visual data provided by the user identifying a vehicle with which communication is desired. Numerous variations are possible. According to one variation, the computer-implemented process further comprises the software application initiating a communication contact, such as a mobile phone call, using the communication contact identifier. According to another variation, operating the server further comprises: receiving visual data identifying a plurality of vehicles into a computer database from operators of the plurality of vehicles; and receiving a plurality of communication contact identifiers into the computer database in association with the plurality of vehicles from operators of the plurality of vehicles. According to yet another variation, operating the server further comprises: receiving into a computer memory, a request to communicate accompanied by the visual data provided by the user identifying the vehicle with which communication is desired; and returning from the computer database a communication contact identifier associated with the vehicle with which communication is desired. According to even further variations, the visual data may further comprise: vehicle tag character sequences, visual characteristics inherent to the vehicle, at least one of the vehicle make, model, and color, or unique visual characteristics assigned to the vehicle by operating the server and subsequently applied to the vehicle.

According to aspects of other embodiments of the invention, a computer-implemented process including operating a computer server including a database of visual data identifying a plurality of vehicles and a communication contact identifier associated with each of the plurality of vehicles, comprises: collecting into the computer database from operators of each of the plurality of vehicles visual data identifying a plurality of vehicles; collecting into the computer database from operators of each of the plurality of vehicles the communication contact identifier associated with each of the plurality of vehicles; and serving, responsive to a request by a user, the communication contact identifier associated with a set of visual data identifying a vehicle specified in the request. According to some variations, the visual data may further comprise: vehicle tag character sequences, visual characteristics inherent to the vehicle, at least one of the vehicle make, model, and color, or unique visual characteristics assigned to the vehicle by operating the server and subsequently applied to the vehicle. According to a variation, the process further comprises: connecting the server to a software application constructed and arranged to make the request by the user.

According to yet other aspects of embodiments, a computer-implemented process for completing a phone call initiated by a device user to a vehicle for which a communication contact identifier is unknown to the device user, comprises: operating a server holding: a database of visual data identifying a plurality of vehicles, current geo-location information for the plurality of vehicles, and a communication contact identifier associated with each of the plurality of vehicles; obtaining a subset of data for a vehicle with which to communicate insufficient to uniquely identify the vehicle; identifying in the database a target vehicle exceeding a set threshold for likelihood of matching the subset of data; and completing a communication channel to the selected target vehicle, for which the communication contact identifier is otherwise unknown to the user, using the communication contact identifier retrieved from the database. In a variation, the process further comprises: obtaining current geo-location information for the device user; obtaining current geo-location information for the plurality of vehicles in the database; selecting as the target vehicle, that one of the plurality of vehicles identified in the database having current geo-location information within a desired range of the current geo-location information for the user. In a further variation, the act of selecting further comprises: picking a target vehicle for which a difference between the target vehicle current geo-location information and the current geo-location information for the device user is a minimum of differences for the set of candidate vehicles. In yet a further variation, the act of obtaining the subset of data for a vehicle with which to communicate further comprising scanning license plates. In another variation, the act of selecting further comprises: scoring a set of candidate target vehicles by a combination of: more likely match, being a likelihood of matching the subset of visual data, and higher proximity, being a smaller difference between each target vehicle current geo-location information and the current geo-location information for the device user; and picking the target vehicle as that candidate target vehicle having a highest score of the combination of more likely match and higher proximity.

In the following description, reference is made to the accompanying drawings, which form a part hereof, and in which are shown example implementations. It should be understood that other implementations are possible, and that these example implementations are intended to be merely illustrative.

DETAILED DESCRIPTION

The following section provides an example of an operating environment in which the invention can be implemented. While the following section makes reference to mobile devices (FIG. 1, 101), other suitable communication devices should also be considered to be included; while the following section makes reference to mobile phone numbers or to phone numbers more generally, other suitable communication contact identifiers should also be considered to be included; and, while the following section makes reference to mobile apps and software applications, other suitable hardware control systems of various description should be considered to be included. Terms in the following description should generally be interpreted expansively where possible, and examples given should be read to include like elements where possible, even if not expressly called out.

Figure 1:
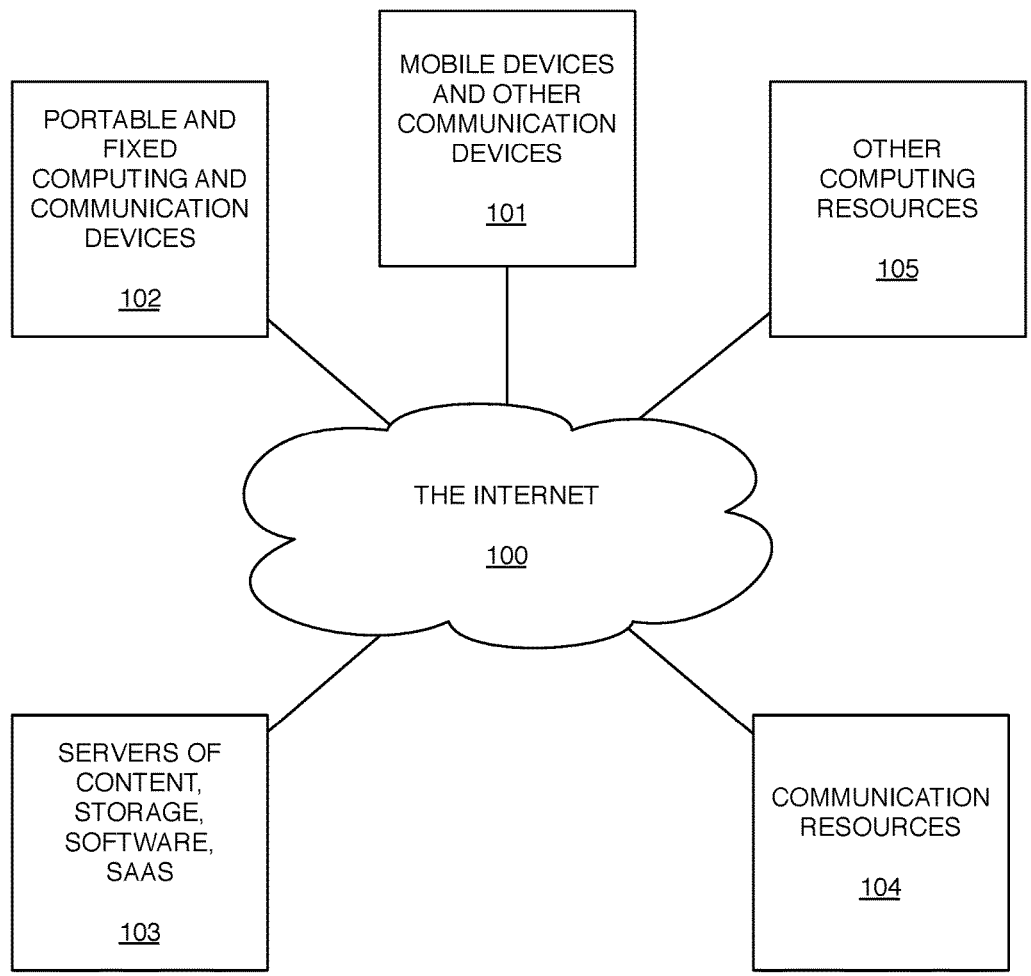
FIG. 1 is a block diagram of an operating environment in which the invention can be embodied.
Figure 5:
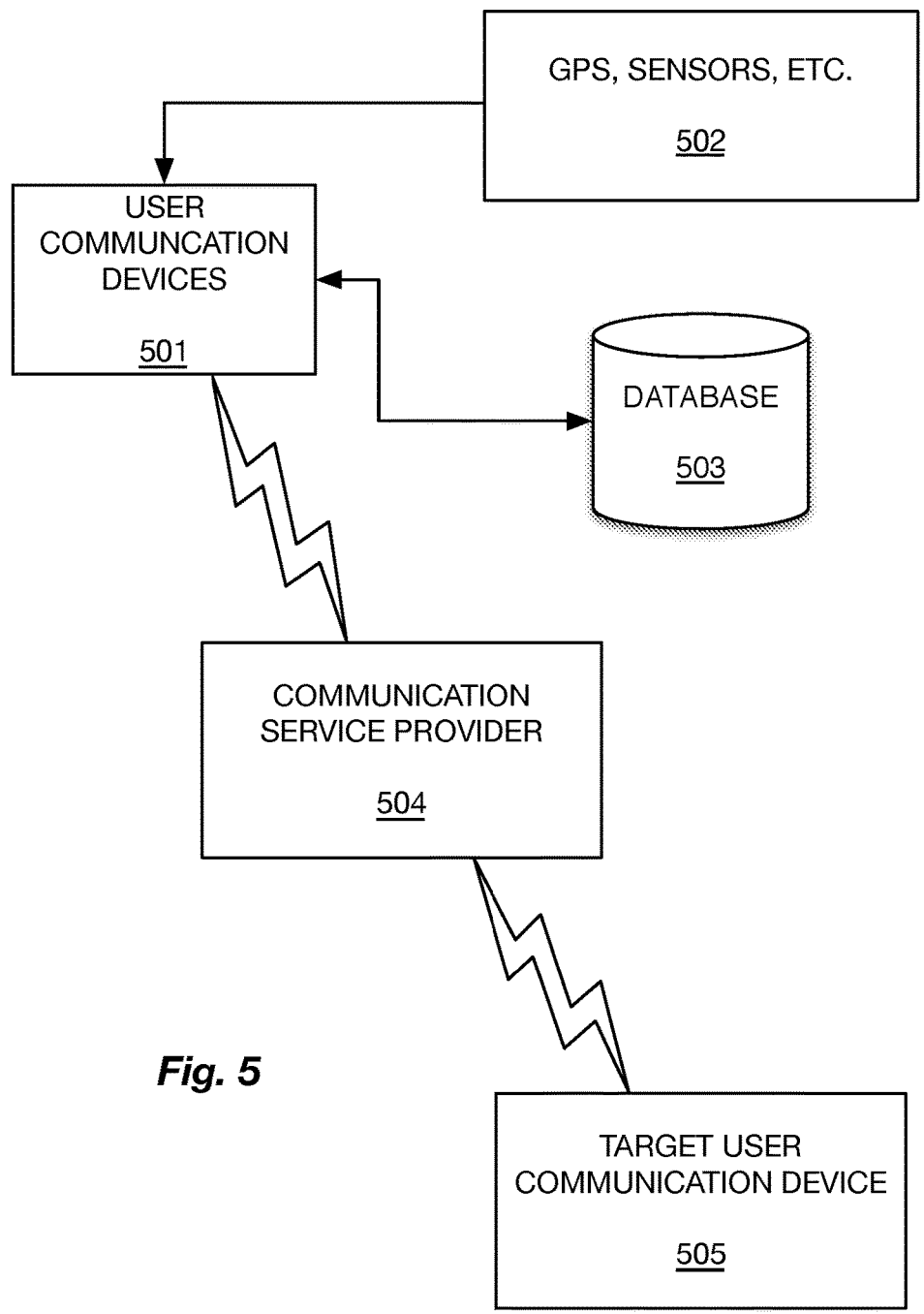
FIG. 5 is a block diagram showing the relationship between the elements of FIG. 1 when used in a system according to aspects of the invention.

Referring to FIG. 1, a computer hardware environment in which the method can be practiced is described. One arrangement of the components of FIG. 1 into a system according to the invention is shown in FIG. 5, described below. The exemplary computer hardware environment can be generally described as a computer network of any suitable size and scope that supports and includes the operational elements and architecture relied on by the exemplary methods and apparatus described below. Some common operational elements and architectural features are now described in connection with FIG. 1.

Various computing devices are interconnected for communication through a computer network having any suitable hardware configuration, such as the global Internet computer network, too. The computing devices can include one or more of any of the following devices: mobile devices, 101; portable and fixed computing devices, 102; servers, 103, of content, software, Software as a Service (SaaS), storage, and other resources; communication resources, 104, such as interconnects, switches, and routers; and other computing resources, 105. Mobile devices, portable and fixed computing devices, switches, routers, and servers generally include a central processing unit (CPU), microprocessor, microcontroller, or similar element that executes software instructions to accomplish the tasks for which they are employed. Local instructions and local data are stored in suitable forms of computer storage and computer memory, including both transitory and non-transitory media and/or signals. Devices may include input peripherals, display peripherals, and other peripherals that are either integrated into the device or connected to the device.

Mobile devices, 101, may include devices that integrate wireless, mobile phone services with Internet-connected, mobile data services. Examples of such devices include smartphones made by various manufacturers, which operate using a variety of operating systems, on a variety of carriers. Mobile devices may also include tablets and other devices intended to operate from a wide range and variety of locations using cellular radio communications links, Wi-Fi radio communications links, and any other suitable communications links. Mobile devices may be integrated into wearable form, eyeglass frames and the like, vehicles, etc.

Mobile devices can be operated in hands-free mode while a user is operating some motor vehicles. Vehicle operators frequently use mobile devices to make phone calls while operating their vehicles, today. The mobile device, smartphone, and mobile apps executing on such devices are used as an example in this description of devices which can execute software applications, initiate communication links, and contact other users using communication contact identifiers such as phone numbers, email addresses and others. The invention is not limited, however, to mobile devices, mobile apps, and phone numbers; fixed and portable devices, other communication systems, and other devices executing software suitable for communication between vehicles can be used.

Conventionally, a vehicle operator desiring to make a phone call or otherwise communicate with another person identifies a recipient in a contact list, email address book, or phone number list, and for example in the case of a phone call passes the phone number to their mobile phone to be dialed. They may, optionally, use voice command or another input device to manually enter the phone number to be reached. If a vehicle operator desires to reach another vehicle operator, there is currently no way to determine the phone number to dial, unless the first vehicle operator already knows the number of the other vehicle operator. In the instance where a vehicle operator observes another vehicle while travelling and desires to call the operator of that other vehicle, means to reach that other vehicle is desired.

As shown in FIG. 5, a user having a mobile user communication device 501, for example a mobile device (FIG. 1, 101), may desire communication with a target user having a target user communication device 505. There are many circumstances in which the user only knows some identifying information about a vehicle or vessel in which the target user is traveling. In such circumstances, the present invention facilitates communication when a phone number or other conventional communication identifier for the target user is unknown. Identifying information for the target user may be entered manually by the user through the mobile user communication device 501. Alternatively, data collected by a GPS, an external keyboard-driven input device, other sensors, and the like 502 may be collected through the mobile user communication device 501; and transmitted to a database server 503. The mobile user communication device 501 and the GPS, sensors, etc. 502 may be components of an integrated item, such as a mobile device (FIG. 1, 101), or may be separate components integrated through suitable communication links.

The database server 503, connected to a computer network, such as the global Internet, can provide a portal through the World-Wide Web to collect and disseminate certain information. For example, automobile owners can link their license tag numbers, boat owners can link their registration numbers or name and hailing port, or vehicle owners can link a list of characteristics of their vehicles (make, model, color, etc.) with their mobile phone numbers.

An app running on the user mobile communication device 501 could provide access to such a portal running on the database server 503, such that entering the license tag number of a vehicle, or other identifying information, would forward to the user mobile communication device 501 the phone number of the target user communication device 505 so that the target user communication device 505 could be called. The phone number could be passed publicly to a phone app running on the user mobile communication device 501, or the phone number could be kept concealed and passed privately to the phone app. In some embodiments of the invention, in order to preserve the privacy of potential target users (possibly including all users), passing the phone number in concealed fashion may be optional, preferred, or mandatory. Blocking of certain callers and other conventional protections may also be implemented.

Smartphones, one important class of mobile devices (FIG. 1, 101; FIG. 5, 501) conventionally include geo-location apparatus that can be used by an app running on the device to track the location of a user of the smartphone. The app described above for finding the phone number of a nearby vehicle operator could also keep track of the locations of users of the system and identify nearby users to each other so they can then contact each other without needing to identify specific vehicles. The GPS input could be internal to the user mobile communication device 501 or could be external 502 and provide geo-location information as an input to the user mobile communication device 501.

Vehicles that have been tracked could be targeted for mobile messaging based advertising linked to the geographic location of the vehicle over time.

The database server 503 through which phone numbers are linked to vehicle characteristics and through which phone numbers are retrieved can include features which link to dating services or other social networking services. That way, the record of an eligible individual participating in a dating service or other social networking service can indicate that they are or are not available to accept contacts through the vehicle communication system. Their availability could be indicated to other users on a map presented on a display of the user's mobile communication device 501, if geo-location is enabled, such that nearby parties desiring to contact eligible individuals through the dating service would know there is a potential contact travelling nearby who they could call through the system. The dating service or social networking service can additionally filter potential contacts by additional criteria specified by the users thereof, so contacts between vehicles will be between people who have expressed the desire to be available to others meeting certain criteria.

As vehicles are identified by users whose geo-location is known, when those users are desirous of calling those vehicles, then those vehicles can thus also be tracked through crowd sourcing. Thus, for example, stolen cars could be tracked.

Other features relying on the tie between an operator's mobile smartphone and their vehicle can be layered onto the system. For example, there can be provided an option to start the operator's car by entering a PIN in the app on the operator's mobile smartphone.

Having now described the general operation of such communication system, a specific example will now be described.

Figure 2:
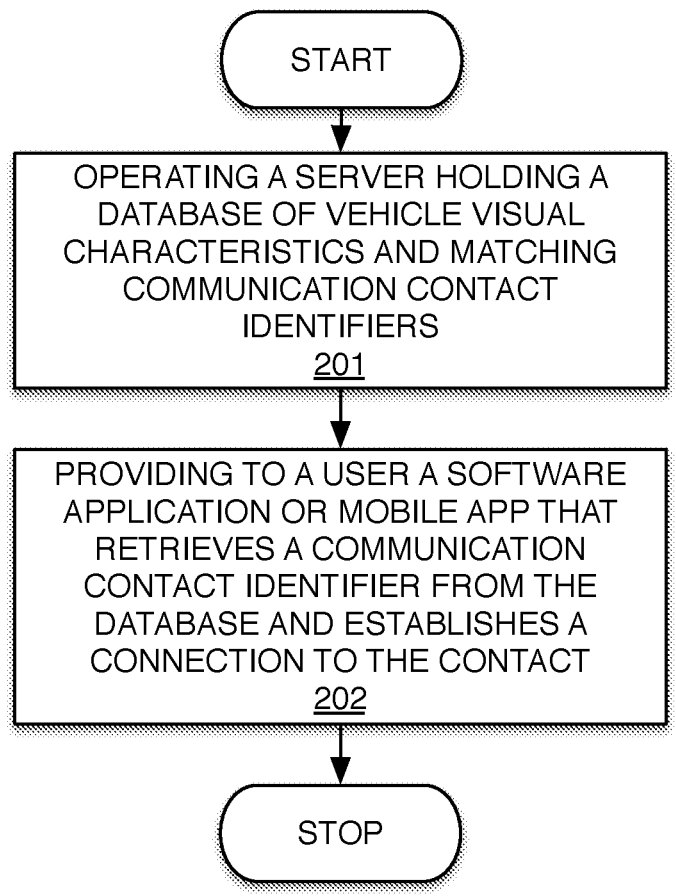
FIG. 2 is a flow chart of a method according to aspects of the invention.

As shown in FIG. 2, a computer-implemented process includes, step 201, operating a server holding a database of visual data identifying a plurality of vehicles and a mobile phone number associated with each of the plurality of vehicles; and, step 202, providing to a user a mobile app constructed and arranged to retrieve a mobile phone number from the database using visual data provided by the user identifying a vehicle with which communication is desired. In variations of this example, the database may be compiled and operated by a social media operator dedicated to the inventive system or the database may be compiled and operated from public records; the database can consist of information provided by users voluntarily with the intent of participating in the inventive system or the database can consist of information compulsorily provided as part of the collection of information for the public record. The mobile app may be constructed and arranged to execute on a smartphone, tablet, or other mobile device, including devices built into vehicles and other suitable devices.

Figure 3:
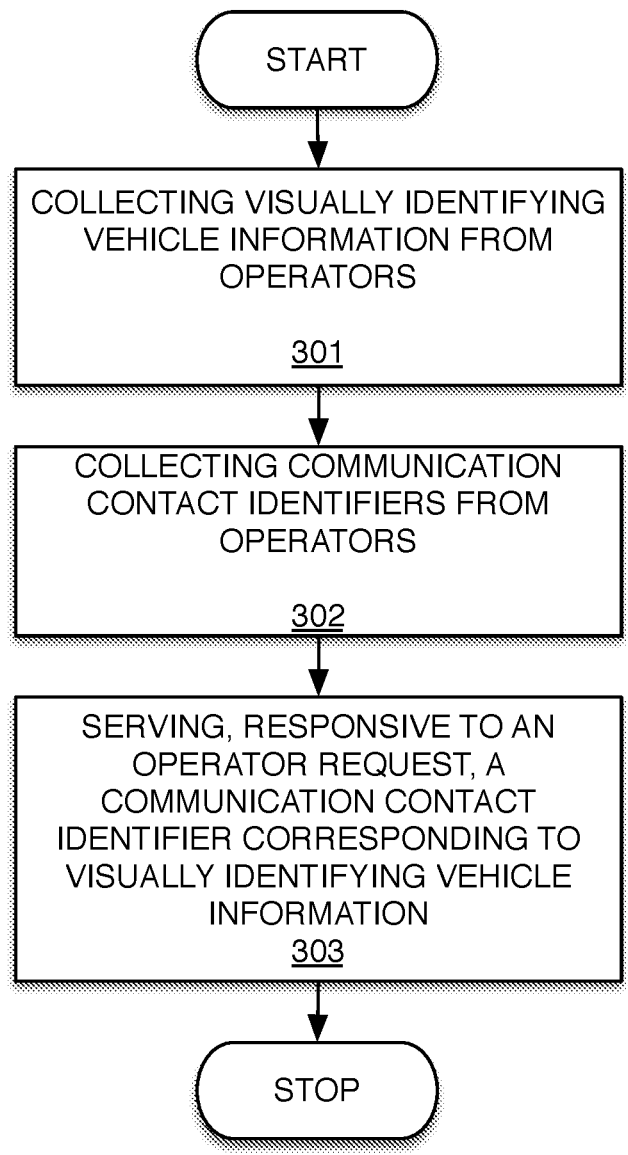
FIG. 3 is a flow chart of another method according to other aspects of the invention.

As shown in FIG. 3, a computer-implemented process including operating a computer server including a database of visual data identifying a plurality of vehicles and a mobile phone number associated with each of the plurality of vehicles includes, step 301, collecting into the computer database from operators of each of the plurality of vehicles visual data identifying a plurality of vehicles; step 302, collecting into the computer database from operators of each of the plurality of vehicles the mobile phone number associated with each of the plurality of vehicles; and, step 303, serving, responsive to a request by a user, the mobile phone number associated with a set of visual data identifying a vehicle specified in the request. In variations of this example, the visual data can be make, model, color, and body style of the vehicle, or the like; or can be license tag number, license tag state, license tag type, license tag color, license tag expiration, or the like. Instead of a mobile phone number, any other communication contact identifier by which a communication device user, such as a mobile device user as described in the above exemplary embodiment, may be contacted through their communication device, a software application, or a mobile app executing on their communication device or mobile device may be used.

Figure 4:
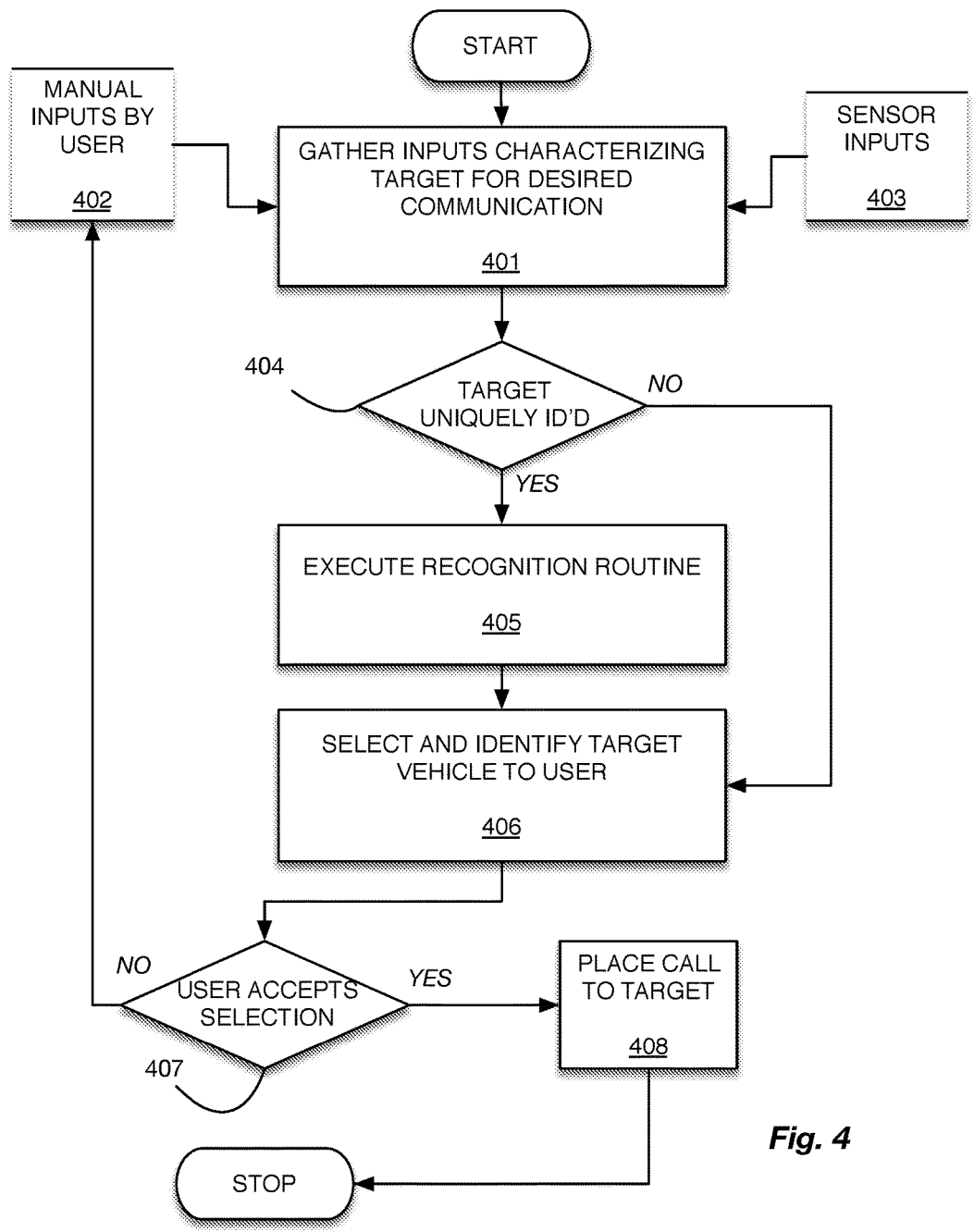
FIG. 4 is a flow chart of yet another method according to yet other aspects of the invention.

The invention further includes a capability for identifying the target vehicle with which a user desires to communicate when the user lacks complete identifying information. A method implementing this capability is illustrated in FIG. 4, which is now explained.

Inputs characterizing nearby vehicles that may be targets for communication are gathered 401 from various sensors and input devices. For example, the user may manually select or input 402 one or more characteristics by typing (in natural language or a data-typed, restricted format), speaking (similar to typing, but using a voice recognition system), picking from a list or palette of choices, or other suitable means. Alternatively, sensors may be provided that gather such information 403 as may be gathered by imaging, radio-frequency identification (RFID), or other electromagnetic passive or active sensors. The information so gathered may include one or more of a license tag number, a vehicle color, vehicle shape, vehicle type, vehicle make, or a vehicle model, any of which may be complete information or a fraction of the information by which a nearby vehicle may be uniquely identified. The characteristics gathered may incompletely or ambiguously characterize potential target vehicles with which the user desires to communicate because they may not uniquely identify the vehicle. In an alternative method of gathering inputs identifying a vehicle with which a user desires to communicate, vehicles that are being tracked by the system may be displayed on a real-time map, from which the user can select the desired target for communication by, for example, touching the image of the vehicle on the display (again, a manual input 402).

If the inputs provided do not uniquely identify 404 a vehicle with which the user desires to communicate, the system then executes a recognition routine 405 that (a) identifies likely targets by close matches of the input characteristics; and, (b) identifies likely targets by proximity to the user. The system forms a weighted combination of the lists of vehicles identified by the criteria of (a) and (b) to select and identify to the user as the target the vehicle 406 most likely to be that with which the user desires to communicate.

If the inputs provided do uniquely identify 404 a vehicle with which the user desires to communicate, that is, the criteria completely match a registered vehicle and its location, then that vehicle is selected and identified to the user as the target 406.

The user may then review 407 the selection identified by the system, and revise any inputs 402 desired if the selection does not appear to correspond to the vehicle with which the user desires communication. Once the user is satisfied that the system has selected and identified the correct vehicle, the user may issue a command to the system by any suitable input means to initiate a call 408 in accordance with the processes described above.

At any time in the process of FIG. 4, the user may abort the process, returning control back to the Start.

What is claimed is:

1. A computer-implemented process for completing a communication channel initiated by a device user with a vehicle for which a communication contact identifier is unknown to the device user, comprising:
   operating a server holding: a database of visual data identifying a plurality of vehicles, current geo-location information for the plurality of vehicles, and a communication contact identifier associated with each of the plurality of vehicles;
   obtaining a subset of data for a vehicle with which to communicate insufficient to uniquely identify the vehicle into a device operated by the device user;
   transmitting from the device operated by the device user to the server the subset of data;
   identifying in the database a target vehicle exceeding a set threshold for likelihood of matching the subset of data; and
   completing a communication channel to the selected target vehicle, for which the communication contact identifier is otherwise unknown to the user, using the communication contact identifier retrieved from the database.

2. The computer-implemented process of claim 1, further comprising:
   obtaining current geo-location information for the device user;
   obtaining current geo-location information for the plurality of vehicles in the database;
   selecting as the target vehicle, that one of the plurality of vehicles identified in the database having current geo-location information within a desired range of the current geo-location information for the user.

3. The computer-implemented process of claim 2, the act of selecting further comprising:
   picking a target vehicle for which a difference between the target vehicle current geo-location information and the current geo-location information for the device user is a minimum of differences for the set of candidate vehicles.

4. The computer-implemented process of claim 1, the act of obtaining the subset of data for a vehicle with which to communicate further comprising scanning license plates.

5. The computer-implemented process of claim 1, the act of selecting further comprising:
   scoring a set of candidate target vehicles by a combination of: more likely match, being a likelihood of matching the subset of visual data, and higher proximity, being a smaller difference between each target vehicle current geo-location information and the current geo-location information for the device user; and
   picking the target vehicle as that candidate target vehicle having a highest score of the combination of more likely match and higher proximity.

6. The computer-implemented process of claim 1, wherein:
   completing a communication channel includes operating a mobile app executing on a smart phone to initiate a mobile phone call using a mobile phone number as the communication contact identifier.

7. The computer-implemented process of claim 1, operating the server further comprising:
   receiving visual data identifying a plurality of vehicles into a computer database from operators of the plurality of vehicles; and
   receiving a plurality of communication contact identifiers into the computer database in association with the plurality of vehicles from operators of the plurality of vehicles.

8. The computer-implemented process of claim 7, operating the server further comprising:
   receiving into a computer memory, a request to communicate accompanied by the visual data provided by the user identifying the vehicle with which communication is desired; and
   returning from the computer database a communication contact identifier associated with the vehicle with which communication is desired.

9. The computer-implemented process of claim 1, wherein the visual data further comprises:
   vehicle tag character sequences.

10. The computer-implemented process of claim 1, wherein the visual data further comprises:
    visual characteristics inherent to the vehicle.

11. The computer-implemented process of claim 10, wherein the visual characteristics include at least one of the vehicle make, model, and color.

12. The computer-implemented process of claim 1, wherein the visual data further comprises:
    unique visual characteristics assigned to the vehicle by operating the server and subsequently applied to the vehicle.

* * * * *